United States Patent [19]
Verhagen

[11] Patent Number: 4,928,271
[45] Date of Patent: May 22, 1990

[54] HOLDER FOR DISCS OF DIFFERENT DIAMETERS

[75] Inventor: Johannes P. C. M. Verhagen, Eindhoven, Netherlands

[73] Assignee: U.S. Philips Corporation, New York, N.Y.

[21] Appl. No.: 199,985

[22] Filed: May 27, 1988

[30] Foreign Application Priority Data

Jun. 10, 1987 [NL] Netherlands ................. 8701345

[51] Int. Cl.5 ............................................. G11B 23/02
[52] U.S. Cl. ..................................... 369/292; 369/273; 369/289; 369/291
[58] Field of Search ............. 369/291, 289, 273, 184, 369/292, 75.2, 77.2

[56] References Cited

U.S. PATENT DOCUMENTS

| 3,282,589 | 11/1966 | Morrison | 369/291 |
| 4,707,821 | 11/1987 | Verhagen | 369/291 |
| 4,797,869 | 1/1989 | Hirano | 369/75.2 |
| 4,837,784 | 6/1989 | Yamamori | 369/291 |
| 4,853,926 | 8/1989 | Covington | 369/291 |

Primary Examiner—Steven L. Stephan
Attorney, Agent, or Firm—Jack E. Haken; John Francis Moran

[57] ABSTRACT

Holder has two opposed holding elements (5) with holding means (6) for holding a disc at its circumferential edge inside the holder. At least one holding element (5) can be moved out of a holding position by means of an adjusting element (4) to receive or to release the disc. The movable holding element is adjustable to at least two holding positions in order to hold discs of substantially different diameter.

11 Claims, 4 Drawing Sheets

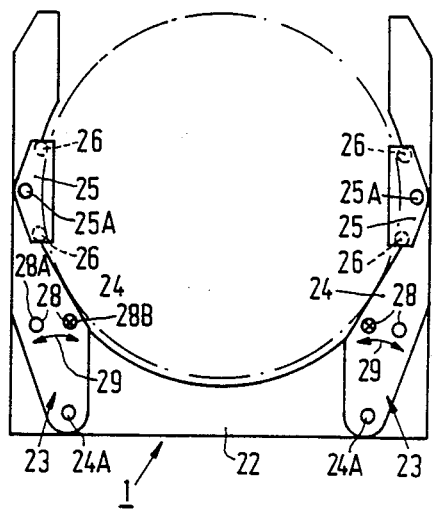
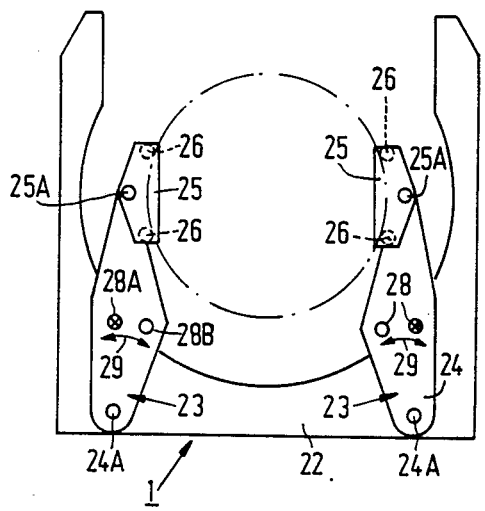
FIG. 3A   FIG. 3B
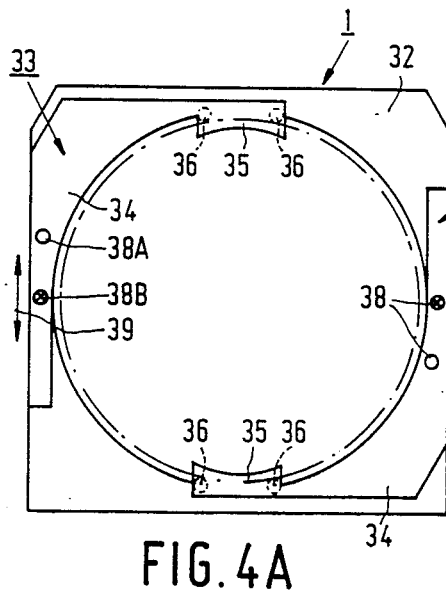
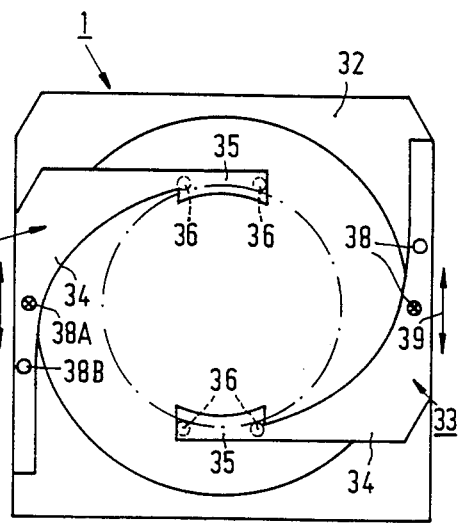
FIG. 4A   FIG. 4B

HOLDER FOR DISCS OF DIFFERENT DIAMETERS

The invention relates to a holder having at least two opposed holding elements which engage a disc at its edge inside the holder. At least one of the holding elements is arranged on an actuating element to allow the holding element to be moved out of a holding position to receive or to release the disc.

U.S. Pat. No. 4,707,821 describes such a holder is adapted to hold discs of one specific diameter, for example a 12 cm diameter Compact Disc, the disc being held at its circumferential edge. Such a holder can be used for packaging discs and can also be employed as an easy-to-handle means for loading discs into or removing them from a disc-record player, in which case the holder must be adapted to the loading mechanism of the disc-record player.

Recently a Compact Disc having a comparatively short playing time has been proposed, which disc has a comparatively small diameter of approximately 8 cm and can be played without adapting the playing means of the Compact Disc player. However, since holding is effected at the circumferential edge and on account of the arrangement of the holding elements relative to each other, the known holder is not suitable for indiscriminately handling discs of comparatively large or small diameter. In order to enable discs of both types to be loaded into a disc-record player by means of holder adapted to the loading mechanism of the player, holders have been proposed in two versions having have equal outer dimensions but having holding elements arranged to suit discs of different diameters. However, the use of different holders is bound to give rise to confusion and requires additional attentiveness both from the supplier and from the user. If the holders are to be used as a means for loading discs of both diameters, holders in two different versions are needed, which may be inconvenient in use and which is also cost-increasing.

SUMMARY OF THE INVENTION

According to the invention the movable holding element is adjustable to at least two holding positions relative to a facing other holding element in order to hold discs of substantially different diameters.

The holder in accordance with the invention permits discs of substantially different diameters to be held at their circumferential edges, adaptation to the disc diameter being effected merely by adjusting the holding element to either of its holding positions. Preferably, the movable holding element is always situated within the outer circumference of the holder in every holding position. Thus, regardless of the adjustment of the holding element the holder can always have the same circumferential dimensions, so that the discs holder can always be inserted in the same enclosure, for example a storage case. This is also of great advantage for loading a disc into a disc-record player, when the loading mechanism can always cooperate with a holder of the same circumferential shape, regardless of the disc diameter. Thus, when the holder in accordance with the invention is used with discs of different diameters the loading mechanism of the disc-record player need not be adapted to the diameter of a disc to be loaded. Another advantage is that the supplier and the user have to deal with only one type of holder, which excludes confusion as to the type of holder.

In a preferred embodiment the actuating element has coupling means which, after insertion of the holder into a disc-record player, can be coupled to actuating means of the disc-record player to move the holding element in both the first and in the second holding position of the movable holding element the coupling means are moved over substantially the same distance relative to the opposed other holding element in order to release the disc. The constant displacement of the coupling means of the actuating element has the advantage that in order to release the disc the actuating means of the loading mechanism always have to be moved over the same distance regardless of the diameter of the inserted disc. Thus, the loading mechanism is capable of loading discs of a first or a second diameter into the disc-record player without any adaptation.

The use of a holding element comprising coupling means which remain at substantially the same location in both holding positions of the holding elements ensures that after the holder has been introduced into the disc-record player the actuating means of the loading mechanism of the disc-record player can simply couple to the actuating element and move the holding element in order to release the disc from the holder. As a result of the fixed location of the coupling means the loading mechanism need not be adapted to the diameter of the inserted disc. A fixed location of the coupling means is also advantageous for other reasons. An advantage is, for example, that during insertion of the disc into the holder the user can move the holding element by applying with his fingers a force at a fixed location of the actuating element. This is also of the advantage for an enclosure which is adapted to receive the holder and which may be provided with latching means adapted to the fixed location of the coupling means in order to latch the holding element when said enclosure contains a holder.

Where the actuating element and the movable holding element form a constructional unit and the holder has a holder body on which the constructional unit is arranged, the constructional unit may be movable between the two holding positions relative to the holder body. This combination of an actuating element and a holding element to a constructional unit has the advantage that the movement of the holding element to release the disc and the adjustment of the holding element to one of the holding positions can be effected in one operation, for example by actuating the actuating element at the coupling means.

Where the holder comprises a holder body and the actuating element forms part of the holder body, the holding element may be movable relative to the holder body while the actuating element is movable between the two holding positions. If the actuating element forms part of the holder body the actuating element always occupies the same position when a disc is present, which simplifies actuation during loading into a player.

The holding means of the movable holding element may include first and second spaced-apart holding portions adapted to cooperate with the circumferential edge of discs of a first and a second diameter respectively. The use of spaced-apart holding portions provides an easy-to-implement possibility of receiving and holding discs of different diameters in the holder.

In this respect a preferred embodiment of the holder in accordance with the invention is characterized in that said adjustment from one holding position to the other is effected by pivoting the holding element, the pivotable holding element being situated within the outer circumference of the holder in every holding position viewed in a plan view at the holder. The use of a pivotable holding element whose movement within the holder circumference is limited provides an easily adjustable construction for a holding element. Such a holding element may be constructed as a bell-crank lever which can be compact and which can rotate within the contours of the holder body.

Another preferred embodiment of a holder in accordance with the invention is characterized in that the movable holding element is constructed as a member which is elastic over at least a part of its length and which can be deflected from one holding position to the other holding position through an unstable dead-centre position. The use of an at least partly elastic member results in a simple and cheap possibility of adjusting the holding element. Such a holding element may, for example, be moulded from a plastics to form an integral unit with the holder body. Adjustment from one position to the other by the user is simple because the member snaps beyond the unstable dead-centre position. The use of an elastic member further has the advantage that in the holding position the member with the holding means is urged against the circumferential edge of the disc without the use of additional spring means.

In this respect another holder in accordance with the invention is characterized in that the member is an elastic strip which has both ends connected to the remainder of the holder and which comprises a central portion on which the holding means are arranged. In such an embodiment the holding element and the holding means are of a simple and cheap construction.

A further preferred embodiment of a holder in accordance with the invention, comprising at least two opposed movable holding elements which each cooperate with an associated actuating element, is characterized in that the two movable holding elements are adjustable to two holding positions. Although the holder in accordance with the invention may be provided with only one movable actuating element it is favourable to utilise two movable actuating elements, because this reduces travel of the holding element necessary to release the disc. It is to be noted that instead of two movable holding elements other numbers of elements may be used. It is possible for example to employ three or four actuating elements in the holder.

The invention further relates to a package comprising such a holder in which a disc is held at its circumferential edge by the holding means. The advantage of such a package is that it can be used with discs of comparatively large or small diameter. Consequently, the supplier and the user have to deal with only one type of package for discs of both diameters.

BRIEF DESCRIPTION OF THE DRAWINGS

FIGS. 3A and 3B are plan views of a third embodiment, the holding elements being shown in a first and a second holding position respectively;

FIGS. 4A and 4B are plan views of a holder in accordance with the fourth embodiment, the holding elements being shown in two different holding positions;

DETAILED DESCRIPTION OF THE PREFERRED EMBODIMENTS

Figure 1A:
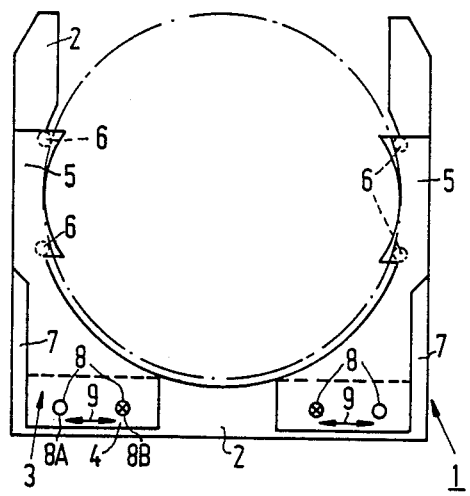
FIGS. 1A and 1B are plan views where the holding elements are shown in a first and a second holding position respectively.
Figure 1B:
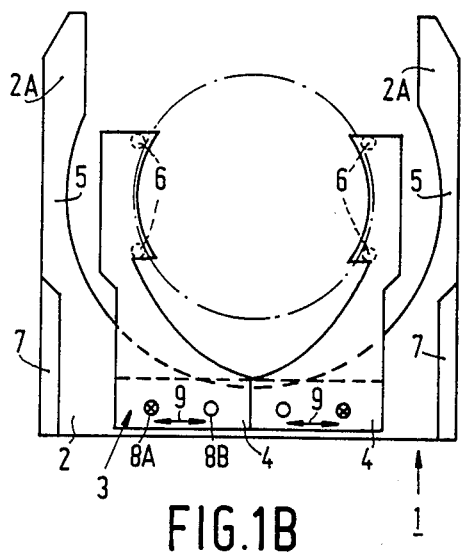

FIGS. 1A and 1B show a holder 1 comprising a U-shaped holder body 2 on which actuating elements 4 and holding elements 5, forming constructional units 3, are slidably guided. The constructional units 3 are adjustable to two holding positions of the holding element 5, namely a first holding position as shown in FIG. 1A and a second holding position as shown in FIG. 1B. Each constructional unit 3 comprises two sliding plates disposed at opposite sides of the holder body and interconnected by holding means 6, which are constructed, for example, as yo-yos and which are arranged between the two sliding plates at the location of the holding element 5. In a manner, not shown, the sliding plates can be interconnected at other locations and the the holder body may be formed with slots, not shown, to enable the constructional unit 3 to be moved. The constructional units 3 are arranged mirror-symmetrically relative to a plane which extends through the base of the holder body 2 and parallel to the limbs of the holder body. On its holder body the holder is provided with positioning means, shown only partly and including upright edges 7 on the two limbs of the holder body. Moreover, the actuating elements 4 are provided with coupling means, which in one of the embodiments shown comprise apertures 8. Thus, each actuating element has two apertures 8. The distance between the apertures is selected in such a way that when the actuating element 4 is moved parallel to the double arrow 9 from the position shown in FIG. 1A, in which a disc of comparatively large diameter is held, to the position shown in FIG. 1B, in which a disc of comparatively small diameter is held, the aperture 8A in FIG. 1B has reached the same position relative to the holder body as occupied by the aperture 8B in FIG. 1A. Thus it is achieved that each time that the holder is placed into a loading mechanism, not shown, of a disc-record player the coupling means can couple to actuating means of the disc-record player without adaptation of the position of the actuating means, so that the units 3 can simply be moved apart by the actuating means to release the disc from the holding means. In every holding position of the holding elements the displacement necessary to release the disc is the same, so that the actuating means always have to perform the same travel, regardless of the diameter of the disc being held. Thus, the holder 1 has the advantage that it can be used universally for holding discs of two substantially different diameters and, in addition, the loading mechanism of a disc-record player can load discs of a first and a second diameter onto the turntable without any further adaptation. This results in a simplified construction for such a loading mechanism. These advantages render the holder 1 suitable for holding optical audio discs of the Compact Disc type, which may have diameters of 12 and 8 cm. However, the holder in accordance with the invention also enables discs of other types, such as video discs of different diameter, to be held. Further, it is to be noted that in addition to the positioning means shown, comprising the edges 7, further positioning means, not shown, may be provided. For example, the base of the holder body may be provided locally with raised portions which in the holding positions of the units 3 snap into the apertures 8 to position the holding elements 5. It may then be advantageous to utilise a slightly elastic material for the constructional units 3, so that a certain pretension is exerted on the sliding plates at opposite sides of the holder body 1. Moreover, positioning can be achieved by making the ends 2A of the limbs of the holder body 2 slightly higher so that the holding elements 5 are also guided at this location. It may also be advantageous to make the units 3 and the holder body 2 slightly elastic, to further facilitate the release of the disc in the holding position shown in FIG. 1A. The two limbs of the holder body 2 then merely have to be bent apart.

Figure 2A:
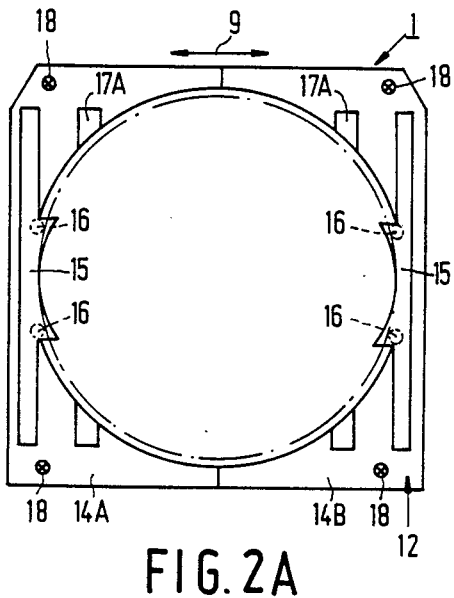
FIGS. 2A and 2B are plan views of a second embodiment, where the holding elements are shown in a first and a second holding position respectively.
Figure 2B:
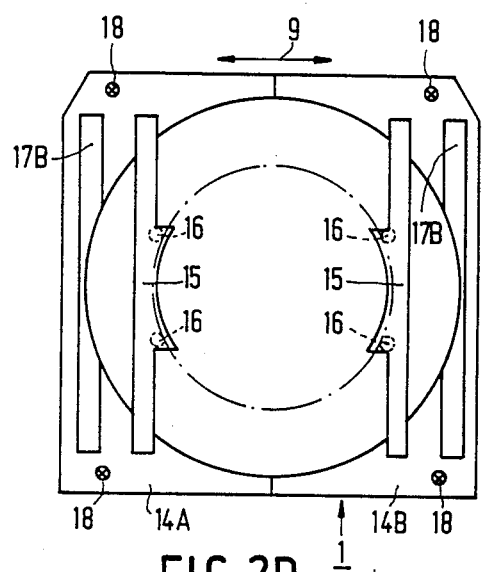

In the embodiment of the holder shown in FIGS. 2A and 2B a holder body 12 comprises sections 14A and 14B which are slidable relative to one another parallel to the double arrow 9, the section 14A comprising for example projections, not shown, which are engageable in the section 14B. In this embodiment the body sections 14A and 14B also constitute actuating elements of the holder 1 and are provided with coupling elements in the form of apertures 18 situated at or near the corners of the holder body 12. In the present embodiment the body sections 14A and 14B again carry holding elements 15 which are arranged mirror-symmetrically relative to one another and which each comprise two plates interconnected by holding means 16 which hold the disc at its circumference. In the present embodiment the holding means are also constructed as yo-yos, which is favourable for claming at the disc periphery. The holder body 12 also carries positioning means, of which only the grooves 17A and 17B are shown, in which grooves the holding element 15 is situated in the respective holding positions. Again it is advantageous if the holding elements are made of a slightly elastic material, enabling the holding elements to snap into the grooves. The advantage of this embodiment of the holder in accordance with the invention is that the actuating elements can be moved to release the disc, whilst the holding elements occupy a fixed position on the associated actuating elements. Another advantage is that the apertures 18 always occupy a fixed position when the holder is placed into a loading mechanism, so that the actuating means of the loading mechanism can couple simply to the coupling means of the actuating elements. In the present embodiment the actuating means again perform the same travel to release the disc, regardless of this diameter.

FIGS. 3A and 3B show a holder 1, comprising a L-shaped holder body 22 on which constructional units 23 are arranged mirror-symmetrically relative to one another, which units each comprise an actuating element 24 which is pivotable about a pivot pin 2A on the base of the holder body 22. Each actuating element 24 carries a holding element 25, said holding element 25 being mounted on the actuating element 24 so as to be pivotable about a pivot pin 25A which extends substantially parallel to the pivot pin 24A. Each holding element comprises holding means 26. These means are constructed as yo-yos in the same way as in the preceding embodiments. In the present embodiment the actuating elements 24 have apertures 28 forming coupling means adapted to cooperate with actuating means of the loading mechanism, not shown, of a disc-record player. The actuating means 24 are adjustable by a pivotal movement about the pivot 24A in the direction indicated by the double arrow 29, the holding element being adjustable to the first holding position as shown in FIG. 3A and the second holding position as shown in FIG. 3B. In the same way as in the embodiment shown in FIG. 1 one of the apertures 28A and 28B occupies a specific position relative to the holder body 22 after adjustment, permitting the actuating means to cooperate with the adjusting means from a fixed location in order to release the disc during loading in the loading mechanism of the disc-record player. Another advantage of this embodiment is that the constructional units 23 are situated outside the circumference of the holder 1 in both positions of the holding elements 25, so that these elements do not hinder loading and a simple enclosure may be used for the storage of the holder. In this embodiment the actuating element 24 can be latched in the respective holding positions in a manner not shown; again it is possible to use local raised portions on the holder body which snap into one of the aperture 28. Alternatively, the embodiment shown in FIG. 3 may be combined with a holder body comprising two sections as in FIG. 2, the two sections of the holder body being slidable relative to one another. Thus, the actuating elements 24 are used for adjusting the holding elements 25 and the disc can be released by moving the sections of the holder body 22 relative to one another. For this purpose this holder body must then be provided with coupling means, such as the apertures 18 in FIG. 2.

FIGS. 4A and 4B show an embodiment of the holder 1 comprising a holder body 32 which at its four sides surrounds the disc, the holder body 32 carrying slidable constructional units 33. These units are slidably guided in the directions indicated by the double arrow 39. Each constructional unit 33 comprises an actuating element 34 and a holding element 35, which are suitably constructed as an integrated unit. Again the holding element 35 comprises holding means in the form of yo-yos. Each actuating element 34 comprises two L-shaped members, a basic portion being formed with apertures 38 which again serve as coupling means adapted to cooperate with actuating means of the loading mechanism of a disc-record player. In the same way as in the embodiment shown in FIGS. 1 and 2 the apertures 38 comprise an aperture 38B in FIG. 4A and an aperture 38A in FIG. 4B at a specific location of the holder body 32, thus enabling actuating means of the loading mechanism which are arranged at a fixed location to cooperate with the holder without any further adaptation, regardless of the position of the holding element 35. In the present case adjustment form the position shown in FIG. 4A to that shown in FIG. 4B is effected by moving the elements 33 in opposite directions relative to one another parallel to the arrows 39. In this case the actuating elements 34 can also be latched in position by engagement of raised portions on the holder body 32 in the apertures 38.

Figure 5A:
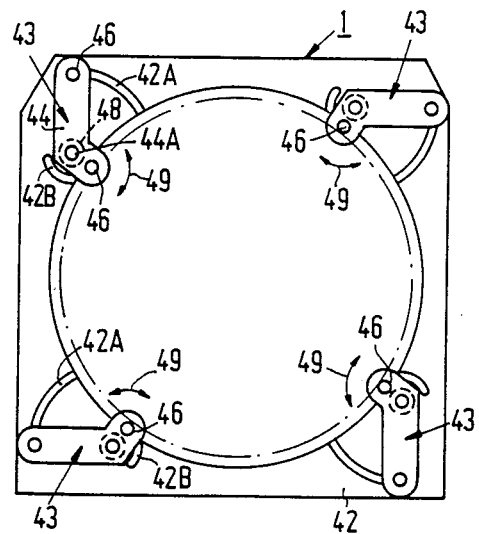
FIGS. 5A and 5B are plan views of a holder in accordance with a fifth embodiment, the holding elements again being shown in two different holding positions.
Figure 5B:
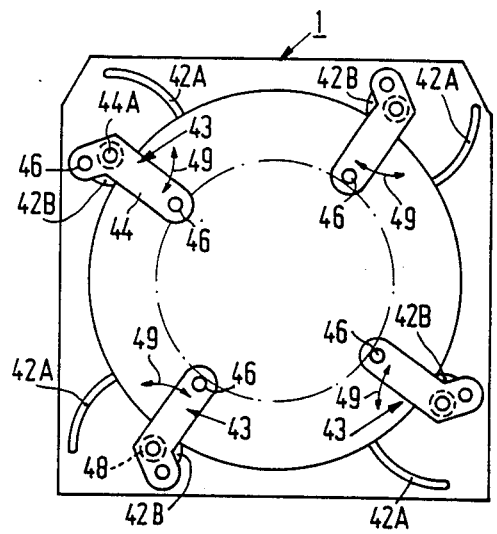

The embodiment of the holder 1 shown in FIGS. 5A and 5B again comprises a holder body 42 which surrounds the disc and on which constructional units 43 are arranged at or near the corners, which units are constructed as bell-crank levers. The units 43 constitute actuating elements 44 which also function as holding elements. To this end the units comprise holding means 46 constructed as yo-yos at or near the free ends of the lever arms, the units being pivotable about pivot pins 44A. The pivotal movement is possible by forming the holder body 42 with slots 42A and 42B in which the means 46 are movable. By pivoting the unit 43 from the position shown in FIG. 5A to the position shown in FIG. 5B one holding means 46 takes place of the other holding means 46. Further, coupling means 48 are provided which in the present embodiment comprise a toothed wheel 48 which is coaxial with the pivot pin 44A. Preferably, the toothed wheel is arranged in such a way that when the holder 1 is placed in a loading mechanism actuating means of the loading mechanism mesh with the toothed wheel 48 to drive said wheel so as to release the disc from the holder. As a result of this, the actuating element 44 of the unit 43 is moved in the direction indicated by the double arrow 49. Thus the actuating means of the loading mechanism drive all four toothed wheels 48 simultaneously. The present embodiment comprises latching means, not shown, to latch the holding element associated with the unit 43 in its two holding positions. This may be effected, for example, by providing the slots 42A and 42B at their ends with clamping means which are adapted to cooperate with the holding means 46. It is to be noted that in the present embodiment, like in the embodiment shown in FIG. 2, it is also possible to construct the holder body 42 as two sections which are slidable relative to one another, to enable the holding elements 44 to be adjusted so as to release the disc during loading in the disc-record player. Instead of four units 43 it is also possible to use different numbers of units, for example three.

Figure 6A:
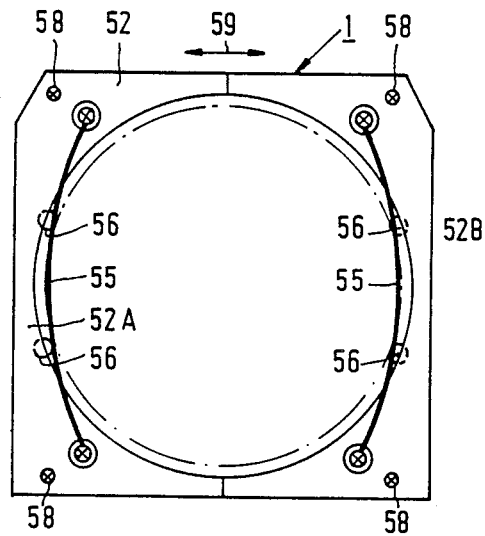
FIGS. 6A and 6B are plan views of a sixth embodiment of a holder, the holder elements again being shown in two different holding positions.
Figure 6B:
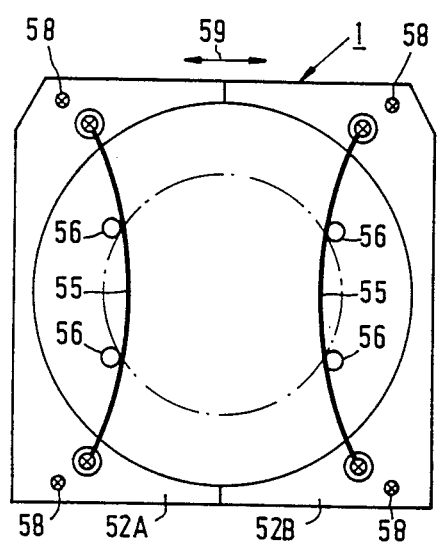

FIGS. 6A and 6B show an embodiment of a holder 1 in which a holder body 52 is divided into two body sections 52A and 52B, which are slidable relative to one another in the same way as in the embodiment shown in FIG. 2. For adjusting the holder-body sections apertures 58 are formed at or near the corners, which apertures also serve as coupling means for the body sections 52A and 52B in order to move the two body sections relative to one another in a loading mechanism. The body sections, which also serve as actuating elements, carry holding elements 55 which are constructed as strip shaped members which at both ends are connected to the body sections 52A and 52B respectively, central portions of the members 55 carrying holding elements 56, which are again constructed as yo-yos. In the central portion of the member 55 a slot (not shown) is formed through which the disc edge is engageable, so that said member does not obstruct holding. It is advantageous to manufacture the member 55 together with the holding means 56 as an integral unit from a plastics. The member 55 is elastic over the greater part of its length and can be deflected from the position shown in FIG. 6A through an unstable dead-centre position to the other holding position shown in FIG. 6B. Thus, moving the holding element 55 from one holding position to the other is effected very simply, the disc being released by moving the body sections 52A and 52B apart in a direction parallel to the double arrow 59.

Figure 7A:
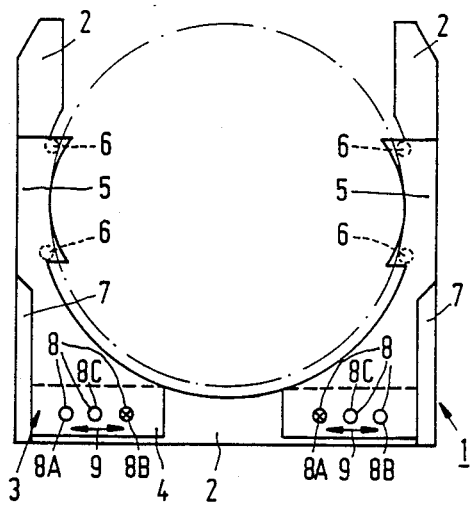
FIGS. 7A, 7B and 7C are plan views of a modification of the holder shown in FIG. 1, the holding elements being shown in three different holding positions.
Figure 7C:
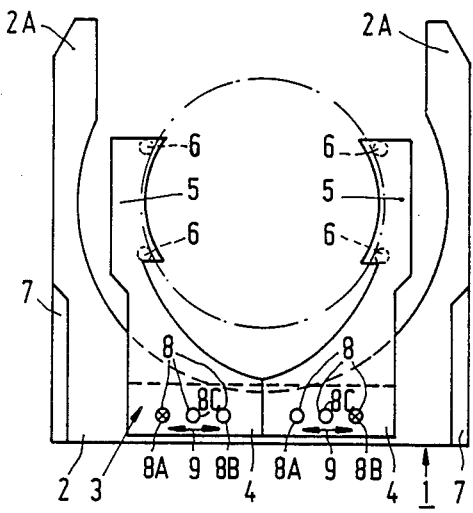
Figure 7B:
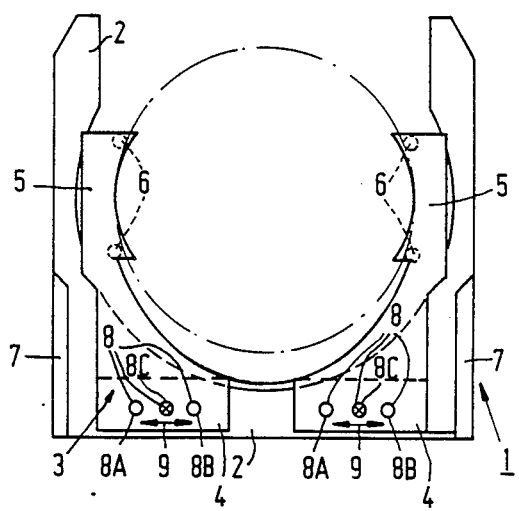

The embodiment of the holder 1 shown in FIGS. 7A, 7B and 7C largely corresponds to that shown in FIG. 1. The difference is the presence of three apertures 8 in each actuating element 8, an aperture 8C being engaged by a raised portion, not shown, in the position shown in FIG. 7B. Thus, the holder 1 in the present embodiment is also capable of holding a disc of intermediate diameter, for example 10 cm. Again it is achieved that in the position shown in FIGS. 7A, 7B and 7C the actuating means of a disc-record player are engageable in apertures 8B, 8C and 8A respectively, at the same location of the holder without any further adaptation.

The holder 1 shown in the various embodiments is very advantageous because it is capable of holding discs of substantially different diameter without a change in the outer dimensions of the holder or without an adaptation of the loading mechanism of the disc-record player. This is a major advantage, for example, when such a holder is used in conjunction with players operating in accordance with the "letter box" principle, the holder being inserted through a front opening in a player. Moreover, the present holder is suitable for universal use as a package or storage means, because only one type of holder is adequate to hold discs of different diameters. It is to be noted that it is alternatively possible to arrange one holding element stationarily and to make only one holding element movable to two holding positions. In that case the displacement of the holding element between its two holding positions is larger than in the embodiments described in the foregoing. In addition, the holder may also be used for holding discs of diameters other than 8 and 12 cm, for example discs of 12 and 25 cm diameter.

What is claimed is:

1. A holder intended for holding a disc, comprising at least two opposed holding elements (5) comprising holding means (6) constructed to engage a disc at its edge inside the holder (1), at least one of said holding elements (5) being arranged on an actuating element (4) to allow said holding element to be moved out of a holding position, by actuation of the actuating element, to receive or release the disc, characterized in that the movable holding element (5) is adjustable to at least two holding positions relative to a facing holding element (5) in order to hold discs of substantially different diameters.

2. A holder as claimed in claim 1, in which the actuating element (4) comprises coupling means (8) which after insertion of the holder (1) into a disc-record player can be coupled to actuating means of the disc-record player to move the holding element (5), characterized in that both in the first and in the second holding position of the movable holding element (5) the coupling means (8) are moved over substantially equal distance relative to the opposed other holding element (5) in order to release the disc.

3. A holder as claimed in claim 2, characterized in that both in a first and in a second holding position of the movable holding element the coupling means are situated at substantially the same location in the holder (FIGS. 2, 5, 6).

4. A holder as in claim 1 in which the actuating element (4) and the movable holding element (5) from a constructional unit (3) and the holder (1) has a holder body (2) on which the constructional unit is arranged, characterized in that the constructional unit (3) is movable between the two holding positions relative to the holder body (2) (FIGS. 1, 3, 4, 5).

5. A holder as claim 1, in which the holder (1) comprises a holder body (12) and the actuating element (14) forms part of said holder body, characterized in that the holding element (15) is movable relative to the holder body (12) and the actuating element (14) is movable between the two holding positions.

6. A holder as in claim 1 characterized in that the holding means of the movable holding element (44) comprise first and second spaced-apart holding portions (46) adapted to cooperate with the circumferential edge of discs of a first and a second diameter respectively (FIG. 5).

7. A holder as claimed in claim 6, in which the holding element (44) is pivotably arranged on the holder body (42), characterized in that adjustment from one holding position to the other is effected by pivoting the holding element (42), the pivotable holding element (42) being situated within the outer circumference of the holder (1) in every holding position viewed in a plan view at the holder. (FIG. 5).

8. A holder as in claim 1, characterized in that the movable holding element is constructed as a member (5) which is elastic over at least a part of its length and which can be deflected from one holding position to the other holding position through an unstable dead-centre position. (FIG. 6).

9. A holder as claimed in claim 8, characterized in that the member is an elastic strip (55) which has both ends connected to the remainder of the holder (1) and which comprises a central portion on which the holding means (56) are arranged. (FIG. 6).

10. A holder as in claim 1, comprising at least two opposed movable holding elements (5) each cooperate with an associated actuating element (4), characterized in that the two movable holding elements (5) are adjustable to two holding positions.

11. A package, comprising the holder (1) as claimed in claim 1, which holder comprises at least two holding elements (5) with holding means (6), of which holding elements a movable holding element (5) is adjustable in two holding positions relative to an opposed other element (5), in combination with a disc which at its circumferential edge is held in the holder (1) by the holding means (6).

* * * * *